US012725167B2

(12) United States Patent
Eby et al.

(10) Patent No.: US 12,725,167 B2
(45) Date of Patent: Sep. 1, 2026

(54) DISCLOSURE STORAGE AND DECISION SYSTEM AND APPLICATION FOR RESOLVING A TRANSACTION CLAIM

(71) Applicant: American Express Travel Related Services Company, Inc., New York, NY (US)

(72) Inventors: Alaric M. Eby, Scottsdale, AZ (US); Adrienne Hill, Cave Creek, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 0 days.

(21) Appl. No.: 19/005,895

(22) Filed: Dec. 30, 2024

(65) Prior Publication Data

US 2026/0187644 A1 Jul. 2, 2026

(51) Int. Cl.
*G06Q 30/01* (2023.01)
*G06Q 30/018* (2023.01)

(52) U.S. Cl.
CPC ........... *G06Q 30/01* (2013.01); *G06Q 30/018* (2013.01)

(58) Field of Classification Search
None
See application file for complete search history.

(56) References Cited

U.S. PATENT DOCUMENTS

2013/0254095 A1* 9/2013 Keller .................... G06Q 40/03 705/38
2020/0364713 A1* 11/2020 Douglas ............... G06Q 20/405
2023/0351399 A1* 11/2023 Burmistrov ........ G06Q 20/4016
2024/0419941 A1* 12/2024 He ....................... G06Q 30/016
2025/0111154 A1* 4/2025 Bar Eliyahu ........... G06F 40/40
2025/0156874 A1* 5/2025 Chauhan ............ G06Q 20/4016
2025/0278576 A1* 9/2025 Kumar .................... G06F 40/40
2025/0315780 A1* 10/2025 Eby .................... G06Q 10/0837

* cited by examiner

*Primary Examiner* — Allan J Woodworth, II
(74) *Attorney, Agent, or Firm* — STERNE, KESSLER, GOLDSTEIN & FOX P.L.L.C.

(57) ABSTRACT

Disclosed herein are system, method, and computer program product aspects for resolving a transaction claim associated with a merchant system. An example implementation receives, from a user device, a transaction claim associated with a merchant system. The implementation performs an information search within a database storing disclosure information between the user device and the merchant system. The implementation retrieves, from the database, specific disclosure information associated with the transaction claim. The implementation generates a prompt that directs an LLM to generate one or more actions associated with the transaction claim. The implementation determines whether at least one of the one or more actions applies to the user device. When the at least one of the one or more actions applies to the user device, the implementation determines whether it applies to the merchant system. The implementation resolves the transaction claim based on the at least one of the one or more actions.

20 Claims, 5 Drawing Sheets

DISCLOSURE STORAGE AND DECISION SYSTEM AND APPLICATION FOR RESOLVING A TRANSACTION CLAIM

BACKGROUND

Today, transaction streams are subject to countless, complex, and convoluted terms, conditions, and disclosures (e.g., merchant policy) between user devices and merchant systems. Online transactions (e.g., purchases, subscriptions, and memberships) are typically bound to purchase and return conditions, which creates inefficiency for both user devices and merchant systems within the transaction stream, such as when a return condition is initiated within the merchant system by a user device. Examples of these inefficiencies include prolonged interactions in communications between user devices and merchant systems (e.g., honoring return polices, abusing privacy policies, and forcing users to adhere to tricky terms and conditions of free trials which are hard to cancel). The problem within this transaction ecosystem is that merchant policies associated with transactions are not integrated into the transaction stream that occurs between user devices and merchant systems.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
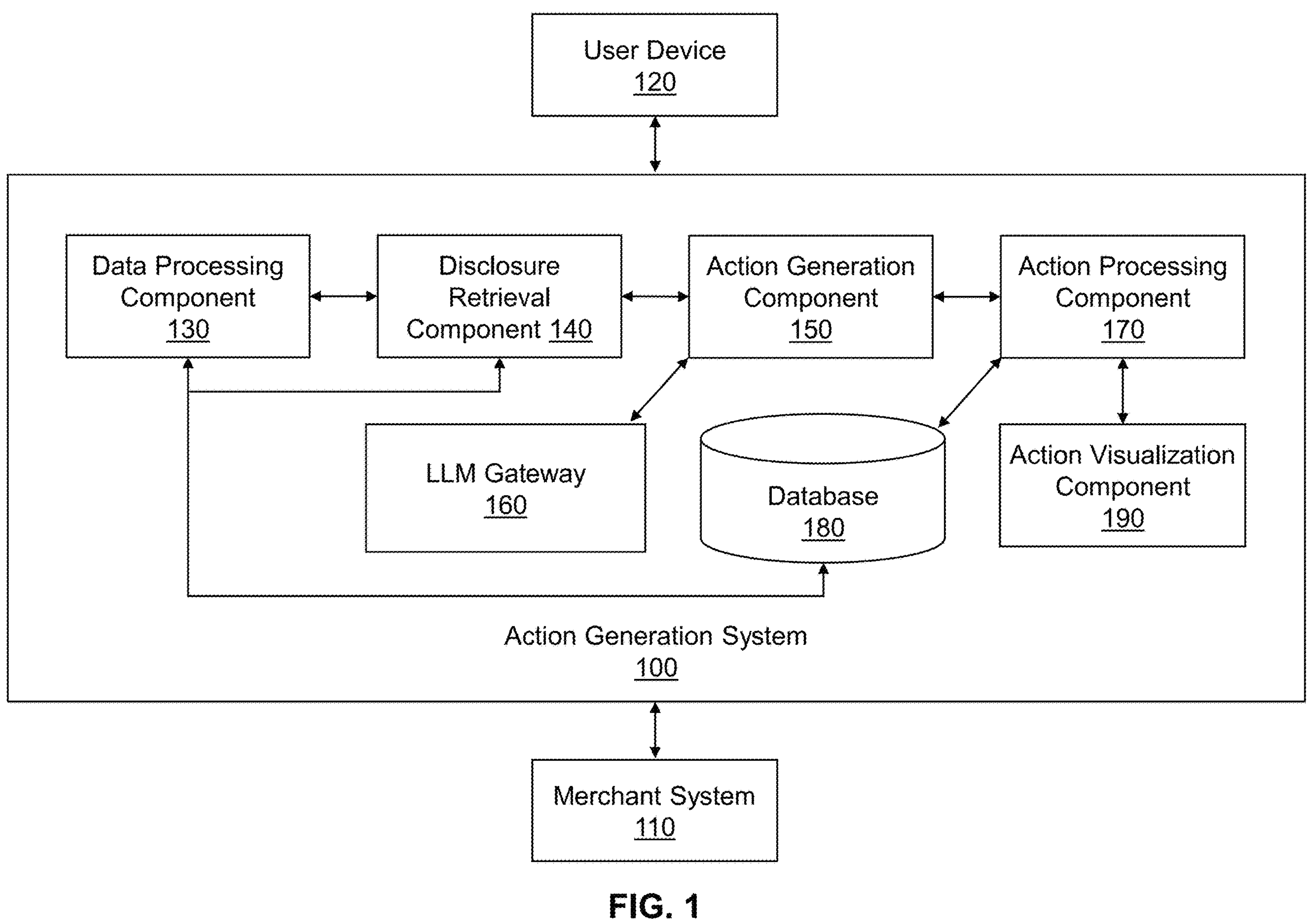
FIG. 1 is a block diagram of an action generation system, according to aspects of the present disclosure.

Provided herein are system, apparatus, device, method and/or computer program product aspects, and/or combinations and sub-combinations thereof, for resolving a transaction claim associated with a merchant system. A transaction claim, referred to as a transaction dispute or chargeback, is a consumer complaint or questioning of a validity of the transaction related to a credit or debit card purchase at a merchant system or their bank. Transactions are most commonly disputed because of fraud (e.g., unauthorized charges) and a lack of merchant follow-through, including but not limited to, merchandise not as expected, services not performed, credit not issued, etc.

Transaction streams are subject to countless, complex, and convoluted terms, conditions, and disclosures associated with user or customer devices when engaging with merchant systems. Technological challenges associated with the user devices within the transaction streams, when making a purchase or signing an agreement with a merchant system, may include, but are not limited to, honoring return polices, abusing privacy policies, and forcing the user devices to adhere to tricky terms and conditions of free trials which are hard to cancel. The user devices may be getting more difficult to decipher a merchant statement or policy within the transaction streams since some merchant systems may prefer to not disclose this information to the user devices when it comes to their fees. Some merchant systems may purposely convolute their statements or policies so they can hide their fees or share with the user devices any confusing statements so that the user devices may not be able to easily identify and compare their merchant services with other merchant providers or competitors.

Merchant systems may also be challenging to deal with user devices in a transaction stream where the user devices generate disputes or claims associated with the transaction stream if a charge or payment on their statement sent to the user devices is not approved by the user devices, typically involving credit card chargebacks. Technological challenges involved within this transaction stream to resolve a transaction claim or dispute arise when such a dispute resolution or any communication between the user device and the merchant system requires extensive agent or human interaction. Since merchant policies are not integrated within the transaction stream, it can result in a costly and time-consuming process for merchant systems to resolve these transaction disputes or claims, often resulting in lost revenue associated with the merchant systems due to the temporary hold on funds while the disputes or claims are investigated, as well as additional fees incurred even if the merchant systems ultimately resolve the claims. Furthermore, frequent disputes or claims from user devices can negatively impact a merchant's reputation and potentially lead to merchant system restrictions within the transaction streams.

In order to streamline the transaction claim or dispute resolution process, reduce wait times, and/or minimize costs associated with both the user device and the merchant systems, the present disclosure provides a technological improvement to the communication system for facilitating transaction claims between user devices and merchant systems. One aspect of this improvement is represented by an action generation system (e.g., also referred to an action generation engine) that is integrated within the transaction stream between user devices and merchant systems. In some aspects, the action generation system can collect all relevant documentation or evidence (from a centrally managed location or database) related to both the user device and merchant system within the transaction streams, including but not limited to, sales receipts, order confirmations, proof of delivery, communication records, any other paperwork that demonstrates the legitimacy of the transaction as agreed upon, and anything that supports either side of the dispute. In some aspects, this action generation system, as a mediator, may facilitate a final agreement or settlement regarding a disputed charge within the transaction streams. As an improvement, this action generation system may automatically generate a mutually agreeable solution for both the merchant system and the user device by at least analyzing the supporting documents and facts from the collected evidence and identifying key points of agreement, disagreement, strengths and weaknesses in each argument. In some aspects, this action generation system may use an advanced AI-enabled system or model to analyze large datasets of past agreements, identify patterns, and suggest potential compromise points based on the specific situation. In some aspects, the action generation system may also verify the evidence and generate an evidence accuracy score, especially if there are discrepancies in the evidence. This action generation system may then transmit the evidence accuracy score along with the verified evidence to card issuers associated with the user device, allowing them to further investigate and decide whether to issue a refund or uphold the charge without taking additional efforts to verify the evidence presented by both parties.

In addition, there are security or privacy issues with current transaction streams that require sharing of sensitive data during the resolution session between user devices and merchant systems. In particular, the user devices in a transaction claim or dispute may suffer from a potential security or privacy concern. When the user devices initialize a dispute on their associated credit card or linked bank account, the dispute process may require sharing user information associated with the user device with the merchant system and the issuing bank, potentially exposing sensitive details about the transaction and the user's financial situation. This user information could be misused by the merchant system or the bank, potentially putting the user device at risk of identity theft or unauthorized transactions if proper security measures aren't in place, especially if the dispute involves sensitive purchases or personal details. Even a legitimate cardholder may dispute a charge they made, which can still result in the merchant system needing to access personal information associated with the user device to verify the transaction.

These security or privacy issues may also include, but are not limited to a data breaches, an improper data or information handling, and/or lack of verification procedures. For example, if a merchant system or a bank system storing dispute information is compromised, hackers could access sensitive details of the user device such as card numbers and billing addresses. Not adequately encrypting personal information during transmission or storage within the dispute process of the transaction streams could leave it vulnerable to unauthorized access. If a dispute process doesn't require sufficient verification of the identity of the user device, it could enable fraudulent devices to dispute charges on someone else's devices or accounts.

As noted above, to tackle the technological challenges related to security or privacy concerns, this action generation system is used as an intermediary system within the transaction stream between the user device and the merchant system and provides preemptive scraping of any disclosure information instead establishing a direct communication between the user device and the merchant system. This action generation system mediates when a transaction claim is initiated between the user device and the merchant system. In some aspects, the action generation system may also preemptively generate actions that may be performed on the transaction that are consistent with the merchant policy (e.g., return by date, condition of return for the transaction, reasons for return) and sends these actions to client device prior to receiving the transaction claim.

As a mediator, this action generation system allows the user device to control how their personal data is accessed, encrypted, and used by different merchant systems while maintaining privacy by not directly sharing their raw data with each individual merchant system; essentially, it acts as a trusted middleman (with sufficient encryption and verification procedures) to manage data access and usage on behalf of the user device, ensuring privacy controls are in place. The intermediary action generation system may anonymize or de-identify data before sharing it with the merchant systems, further protecting user privacy. The intermediary action generation system may also manage access permissions, only allowing specific data to be shared with authorized merchant systems based on any parameters defined by user devices. In addition, by using this intermediary action generation system, user devices may be informed about how their data is being used and have the ability to monitor and manage the data sharing. This action generation system may associate disclosure and agreements with a user device in a privacy preserving way to understand, detect, and correct violations by exposing the violation to the violated and offering options to the violated.

In summary, this disclosure is directed to an action generation system for seamlessly integrating merchant policies into transaction streams to streamline the resolution of a transaction claim associated with a merchant system. With the help of this action generation system, user devices can identify a transparent merchant pricing and service and correct any poor seller or merchant behaviors. Also, with increasing complexity of online shopping, agreements, and invasions of privacy, the merchant system can create a service which defends against mistreatment while minimizing financial loss from any false positive fraud claims. In addition, using this action generation system as a trusted middleman, user devices may retain ownership and control over their data, deciding which information can be accessed by different merchant systems and for what purposes. As such, this action generation may manage data access and usage on behalf of the user device, ensuring privacy controls are in place during any transactions or claims. These and other aspects of the present disclosure will be described in further detail below with respect to the accompanying drawings.

FIG. 1 is a block diagram of an action generation system, according to aspects of the present disclosure. In some aspects, action generation system 100 may include but is not limited to a data processing component 130, a disclosure retrieval component 140, an action generation component 150, a large language model (LLM) gateway 160, an action processing component 170, a database 180, and/or an action visualization component 190. Data processing component 130 may include one or more processors, buffers, servers, routers, modems, antennae, and/or circuitry configured to interface with disclosure retrieval component 140 and/or database 180. Disclosure retrieval component 140 may include one or more processors, buffers, servers, routers, modems, antennae, and/or circuitry configured to interface with data processing component 130, action generation component 150, and/or database 180. Action generation component 150 may include one or more processors, buffers, servers, routers, modems, antennae, and/or circuitry configured to interface with disclosure retrieval component 140, LLM gateway 160, and/or action processing component 170. Action processing component 170 may include one or more processors, buffers, servers, routers, modems, antennae, and/or circuitry configured to interface with action generation component 150, database 180, and/or action visualization component 190.

In some aspects, merchant system 110 may be a separate computing platform including but not limited to smartphones, tablet computers, laptop computers, desktop computers, web browsers, and/or other computing devices, apparatuses, systems, or platforms. In some aspects, merchant system 110 may transmit information to action generation system 100 either in a wired or wireless manner and may be, for example, the Internet, a Local Area Network, or a Wide Area Network. The transmission may utilize a network protocol, such as, for example, a hypertext transfer protocol (HTTP), a TCP/IP protocol, Ethernet, or an asynchronous transfer mode.

In some aspects, user device 120 may be a separate computing platform including but not limited to smartphones, tablet computers, laptop computers, desktop computers, web browsers, and/or other computing devices, apparatuses, systems, or platforms. In some aspects, user device 120 may transmit information to action generation system 100 either in a wired or wireless manner and may be, for example, the Internet, a Local Area Network, or a Wide Area Network. The transmission may utilize a network protocol, such as, for example, a hypertext transfer protocol (HTTP), a TCP/IP protocol, Ethernet, or an asynchronous transfer mode.

In some aspects, action generation system 100 may receive data from user device 120. The data from user device 120 may include, but is not limited to, any user device information (e.g., identify, geographical location, etc.), transaction date, amount, merchant system name, billing address, reason for dispute (e.g., unauthorized charge, item not received, damaged goods), and any relevant communication with the merchant system. The data from user device may also include a transaction claim associated with a merchant system 110, a historical transaction claim, an action associated with the historical transaction claim, and/or any feedback from the user device regarding whether to apply any generated actions to the user device or the merchant system. A transaction claim from user device 120 may refer to questioning a validity of a transaction and filing a complaint with merchant system 110.

In some aspects, action generation system 100 may also receive data from merchant system 110. The data from merchant system 110 may include, but is not limited to, transaction details or record associated with user device 120, such as purchase amount, card information, shipping information, tracking numbers, product descriptions, customer service records, or any other necessary information for completing a transaction, and other relevant data or evidence supporting the legitimacy of the transaction made by the user device. For example, the supporting document may also include, but is not limited to, merchant policy or rules (e.g., 90-days return policy) associated with the transaction claim initialized by user device 110.

In some aspects, the data from user device 120 and merchant system 110 may both include, but is not limited to, an agreement (e.g., terms and stipulations when making a purchase) between the user device and the merchant system, and/or any information related to disclosure information between the user device and the merchant system that have been recorded by both parties or by a third-party agency.

After action generation system 100 receives the data from user device 120 and/or merchant system 110, data processing component 130 may be triggered by the data characteristics that matches predefined criteria in data processing component 130. These criteria may be determined based on a list of factors, including but not limited to, types of data input, the system capabilities, the computational resource, and/or any transmission effects. Data processing component 130 may then process the data from user device 120 based on the criteria. The data processing may include, but is not limited to, data preprocessing, data converting (e.g., data chunking, data vectorization, etc.), and/or data embedding.

In some aspects, when receiving new disclosure information from user device 120 and/or merchant system 110 (e.g., a new agreement or new policy between the user device and the merchant system), data processing component 130 may process this new information and then update database 180 to incorporate this new disclosure. In some aspects, during the processing, data processing component 130 may also identify any changes of the disclosure information between the user device and the merchant system. Data processing component 130 may then incorporate the change of disclosure information into database 180.

In some aspects, data processing component 130 may additionally analyze, within database 180, one or more historical transaction claims and one or more actions associated with the one or more historical transaction claims, associated with the merchant system over a period of time, to generate a user behavior pattern associated with user device 120 and a merchant behavior pattern associated with merchant system 110. In particular, data processing component 130 may generate a user score indicating a user trustworthiness level from the user behavior pattern. Data processing component 130 may also generate a merchant score indicating a merchant trustability level from the merchant behavior pattern. In some aspects, the user score and the merchant score may be factored into at least resolving the transaction claim or receiving a new transaction claim which are initialized by user device 120 and associated with a merchant system 110. For example, the user score and/or the merchant score may be used to stop the transaction or stop any transaction claims when the user score and/or the merchant score may be indicative of any suspicious transactions or claims. The user score and/or the merchant score may also be used to promote the transaction or claims if the scores may indicate any superior user or merchant behaviors.

After the data from user device 120 and/or merchant system 110 is processed at data processing component 130, data processing component 130 may transmit the processed data to a disclosure retrieval component 140. The processed data may include, but is not limited to, a processed version (e.g., in a structured and/or processed format) of a transaction claim associated with merchant system 110, a transaction record of user device 120 associated with the merchant system, any disclosure information between the user device and the merchant system, and/or any other multi-modal information related to the disclosure information. The overall disclosure information between the user device and the merchant system may be pre-processed and stored into database 180 before runtime processing. In response to the processed data, for example, a processed transaction claim from data processing component 130, disclosure retrieval component 140 may then perform an information search within database 180 to retrieve the relevant or specific disclosure information associated with the processed transaction claim. The retrieved disclosure information may be represented and/or stored in the form of one or more data chunks. A data chunk is referred to as a piece of data that is used to break down larger data sets or information into more manageable pieces. In some aspects, a data chunk may also refer to a fragment of information from the retrieved disclosure information/data that is typically smaller than the original disclosure data. Multiple data chunks may be combined from different sources of disclosure information (e.g., various policies or agreements that may co-exist between user device 120 and merchant system 110) as to form an output of disclosure retrieval component 140.

Storing the retrieved disclosure information in data chunks is beneficial because it allows for faster data access, more efficient processing of large datasets or complex queries, parallel processing capabilities, and better memory management by dividing large amounts of data into smaller, more manageable units. In particular, storing the different parts of the disclosure information associated with a transaction claim as data chunks allows for easier data storage, processing, and retrieval within the transaction stream. For example, when only specific disclosure information of a large disclosure dataset is needed, retrieving the relevant data chunk is faster than accessing the entire data set at once. By splitting data or information into data chunks, multiple processors can work on different data chunks simultaneously, reducing processing time for large datasets. Smaller chunks require less memory to load and process when working with large datasets on systems with limited memory.

After receiving the processed transaction claim from data processing component 130 and/or the retrieved disclosure information from disclosure retrieval component 140, action generation component 150 may generate an action that may resolve the transaction claim. In some aspects, action generation component 150 may query an LLM to generate this action. By doing this, action generation component 150 may generate a prompt based on combining the transaction claim, the specific disclosure information, and/or any instructions (e.g., that may direct the LLM to perform any task). Action generation component 150 may then query the LLM for a response via LLM gateway 160 in which the LLM gateway 160 may act as an intermediary, channeling requests to any external LLM services and handling responses. After receiving the response from the LLM via LLM gateway 160, action generation component 150 may transmit the generated action to an action processing component 170.

After receiving the action from action generation component 150, action processing component 170 may determine whether the generated action applies to user device 120 and/or merchant system 110. In some aspects, if the generated action can also be applied to merchant system 110, action processing component 170 may execute the action to address the transaction claim. If the generated action may not be applied to the merchant system, action processing component 170 may then generate a dispute associated with the transaction claim. In some aspects, action processing component 170 may update an action list associated with the transaction claim in database 180 after executing the action. In some aspects, action processing component 170 may create the action list based on user data obtained from user device 120. For example, user device 120 may predefine a small group of actions that may be applied at early stage of the action generation in which the action list may grow (e.g., or update) each time when a new action is executed. In some aspects, action processing component 170 may also recommend a transaction to user device 120 after receiving the generated action from action generation component 150. For example, action processing component 170, after processing the action, may identify any sale promotions coming out—that is, instead of resolving the current transaction claim, action processing component 170 may recommend a new action that may apply to both user device 120 and merchant system 110. For example, instead of returning or refunding a current transaction back to the merchant system, action processing component 170 may provide a list of new transactions that can replace the current transaction (e.g., with lower price but having the similar functionalities). In some aspects, action processing component 170 may recommend transactions to the user device based on the user's transaction history, such as credit card purchases or online shopping, along with the generated actions from action generation component 150. This transaction history can be used to understand and/or gain insight into a user's interests. In some aspects, action processing component 170 may receive any feedbacks from user device 120 after recommending a product or service to them based on their past purchase history or other data (e.g., pricing behavior, return behavior, all other behavior patterns) related to user device 120 or merchant system 110, allowing action processing component 170 to learn and improve its recommendations for any future user devices. In some aspects, the feedbacks may include, but are not limited to explicit feedbacks and implicit feedbacks. Explicit feedbacks may refer to when a user device directly indicates their opinion about a recommendation, such as rating it with stars, clicking "like" or "dislike," and/or leaving a written review. Implicit feedbacks may refer to when a user's behavior indicates their opinion, such as purchasing a recommended item, adding it to their cart, and/or viewing it for a significant amount of time. After processing the generated action and/or recommending any substitute actions to user device 120, action processing component 170 may transmit those actions to an action visualization component 190.

After receiving the processed action from action processing component 170, action visualization component 190 may create a user interface (UI) to display the actions. In some aspects, action visualization component 190 may directly receive transaction or claims from user device 120. Action visualization component 190 may display the transactions or claims in the UI. For example, action visualization component 190 may allow user device 120 to view transactions under different categories, for example, sales, purchases, receipts, payments, back transactions, and/or international transactions. Action visualization component 190 may also allow user device 120 to view any un-ignored or ignored transactions—a transaction that has been removed from calculations and balances but is not deleted, especially any fraudulent transactions. By doing this, action visualization component 190 may display a transaction flag associated with the transaction which provides additional metadata tag (e.g., transaction ID, type, date, amount, status) for easier identification and recognition. Action visualization component 190 may also display transactions that have been categorized but have not been reconciled in which the component may generate a summary showing the financial records of the transactions across different systems or accounts. In addition, action visualization component 190 may allow communication between user device 120 and the UI. Action visualization component 190 may allow user interaction which is the point of contact where the user device may input commands or information and action visualization component 190 may also receive feedback from the device, whether through visual elements on a screen, touch gestures, voice commands, physical buttons, and/or any other types of commends. In some aspects, action visualization component 190 may display information back (e.g., any actions the user device may want to apply to the transaction such as a return or refund action) to the user device through visual elements such as text, icons, animations, or graphical changes on the screen, allowing the user device to understand the response to their actions.

Figure 2A:
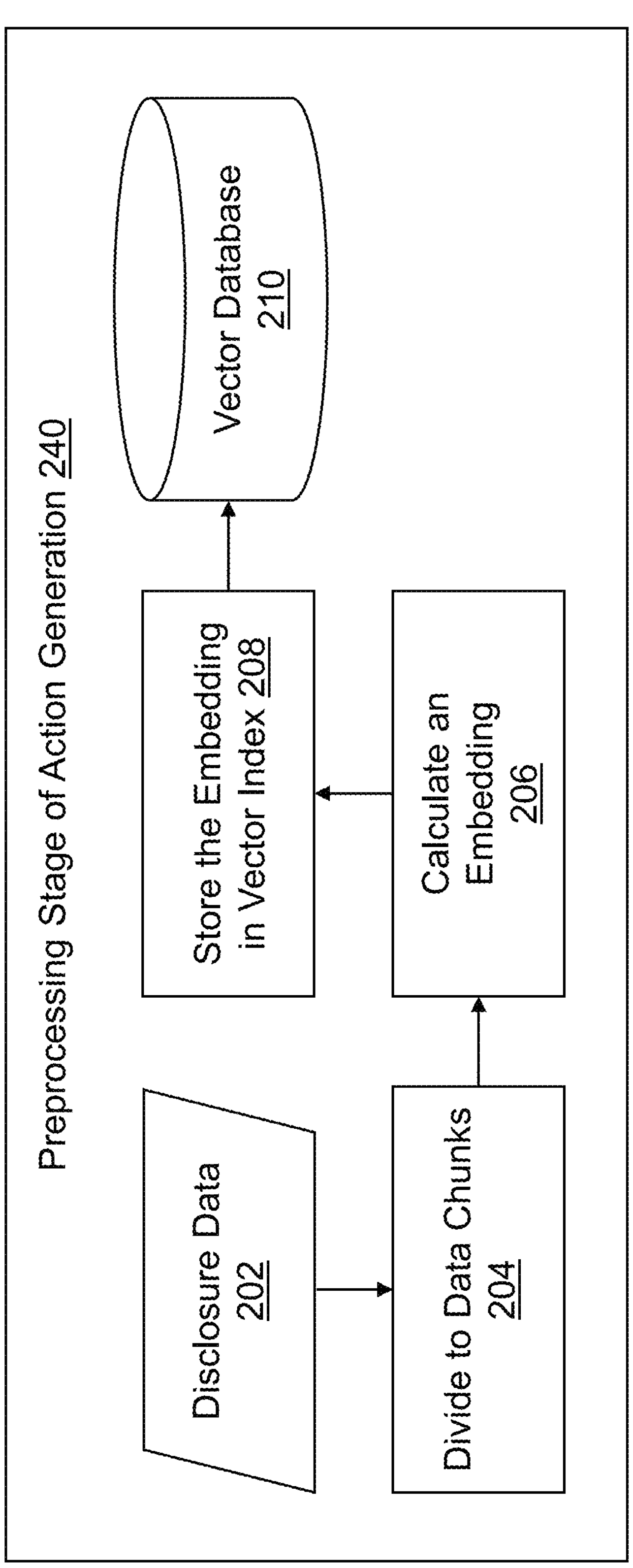
FIG. 2A is a preprocessing stage of action generation, according to aspects of the present disclosure.

FIG. 2A is a preprocessing stage of action generation, according to aspects of the present disclosure. In preprocessing stage of action generation 240, action generation system 100 may receive disclosure data between the user device and the merchant system. Action generation system 100 may divide them into data chunks and/or fragments. Action generation system 100 may calculate embedding for each data chunk and then store the embedding into a database using a vector index.

In 204, disclosure data 202 may be divided and/or tokenized into data chunks. The reasons for doing this data division may include, but are not limited to, indexing more specific information and/or fitting the limited context window of the LLM. A data chunk may refer to a fragment of information from disclosure data 202 that is typically smaller than the original disclosure data. In some aspects, for text-related disclosure data, data chunks may include, but are not limited to, a paragraph, one or more sentences, and/or any other texts with suitable lengths. In some aspects, portions of data chunks may overlap. The data chunking approaches may include, but are not limited to, semantic chunking, recursive chunking, structural chunking, fixed-sized chunking, and/or content-aware chunking. Data chunking may help optimize the relevance of the content retrieved from a vector database 210. The quality of the content generated from the LLM can be influenced by the data chunking strategy—the optimal chunk size is a balance between small and specific data chunks and larger, more comprehensive ones; and the chunk overlap may be effective to ensure continuity and context between chunks, preventing the segmentation from disrupting the flow and coherence of the texts. In some aspects, disclosure data 202 may include any other modalities, and the disclosure data can be divided as non-text chunks. The non-text chunks can be a small segment of a larger disclosure dataset not composed of textual information, such as such as a portion of an image file, a section of audio data, or a specific set of numerical values from a spreadsheet, and/or any data types that are not primarily text-based.

In 206, the embedding may be calculated for the data chunks obtained from 204. The embedding may refer to a numerical representation (e.g., in a high-dimensional vector space) of the data chunks. The embedding approaches may include, but are not limited to, one-hot encoding, Bag of Words (BOW), Term Frequency and Inverse document Frequency (TF-IDF), Word2Vec, Skip-Gram, and/or any pre-trained word-embedding using embedding layers or models.

In 208, the vector index may be used to store the calculated embedding from 206. A vector index is a data structure to efficiently store and retrieve high-dimensional vector data, enabling fast similarity searches and nearest neighbor queries. This vector indexing technique may involve neatly arranging the high-dimensional vectors in a searchable and efficient manner. This arrangement may be done in a way that similar vectors and/or embedding are grouped together, by which vector indexing allows quick and accurate similarity searches and pattern identification, especially for searching large and complex datasets. The vector indexing approaches may include, but are not limited to, an Inverted File (IVF), variants of IVF (e.g., IVF-flat, IVF-product quantization, and/or IVF-scalar quantization), and/or a Hierarchical Navigable Small World (HNSW) algorithm (e.g., probability skip list, and/or NSW).

In addition, a vector database 210 may be constructed to manage the vector index from 208. The functionalities of vector database 210 may include, but are not limited to, data management, metadata storage and filtering, scalability, real-time updates, backups and collections, ecosystem integration, and/or data security and access control.

In some aspects, the data stored in vector database 210 may be organized and accessed through its associated metadata—meaning information describing the data itself, such as creation date, file type, author, or location. This organized data storage may allow for efficient searching, retrieval, and management, especially when dealing with large volumes of unstructured data. For example, one example of this data storage may refer to object storage in a cloud computing platform where each data object is paired with detailed metadata that may facilitate quick identification and access.

In some aspects, action generation system 100 may scrap the disclosure data or information between the user device and the merchant system over a period of time to extract any changes of the disclosure information. The change of disclosure information may refer to when a merchant system needs to update or modify the information they are required to disclose to the public—usually due to a change in circumstances, new regulations, or new policies, which could include details about financial status, risks, or other material aspects of their operations. Action generation system 100 may update the disclosure information in vector database 210 to incorporate the changes of the disclosure information, essentially when previously disclosed information is no longer accurate and needs to be revised. In some aspects, action generation system 100 may also update the disclosure information in vector database 210 to incorporate any new disclosure information between the user device and the merchant system over a period of time.

Figure 2B:
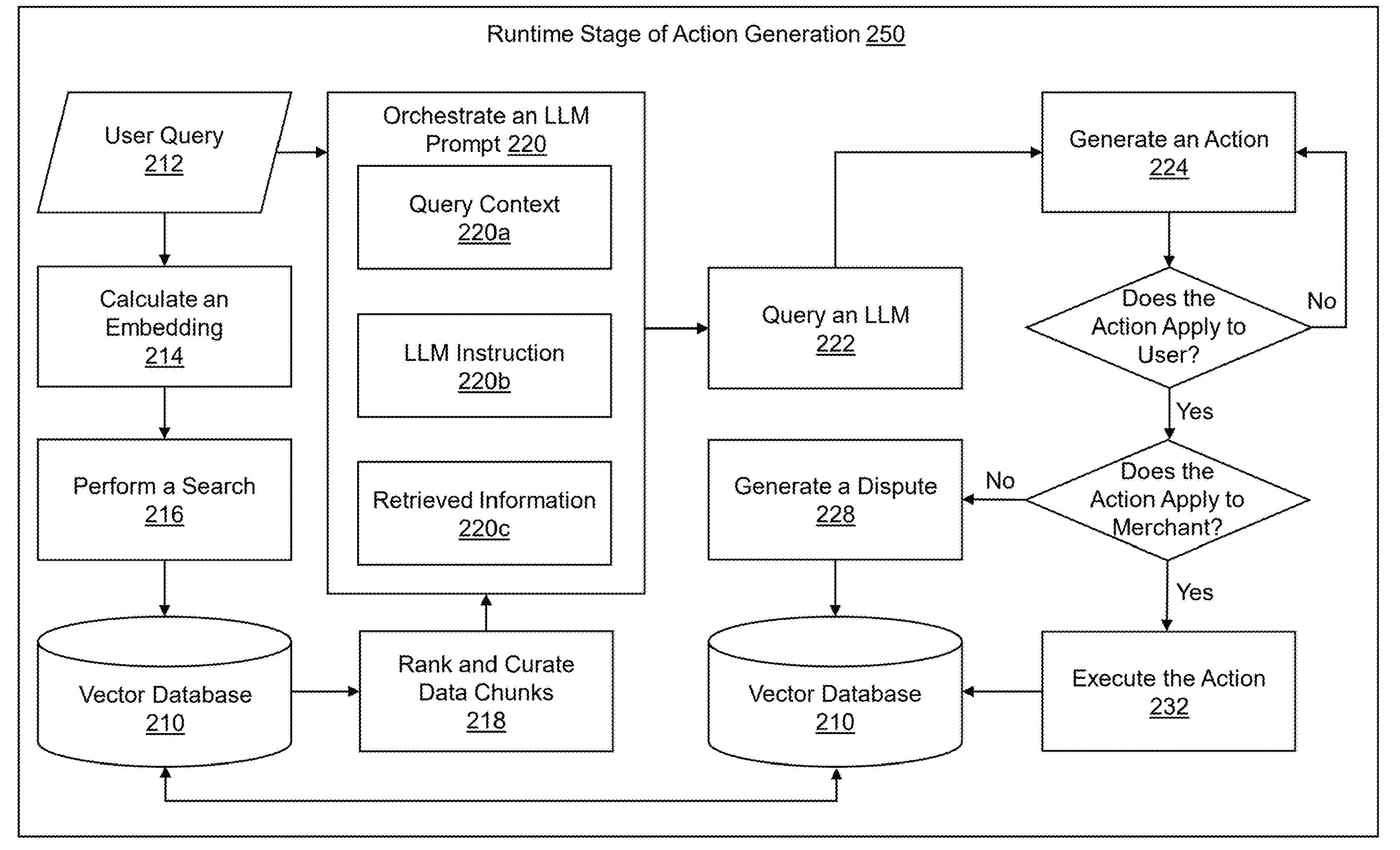
FIG. 2B is a runtime stage of action generation, according to aspects of the present disclosure.

FIG. 2B is a runtime stage of action generation, according to aspects of the present disclosure. In runtime stage of action generation 250, action generation system 100 may receive a user query, including but not limited to, a query context and/or an LLM instruction. The query context may include a transaction claim, sent from a user device, associated with a merchant system. Action generation system 100 may calculate embedding for the user query, and then perform a similarity search to retrieve, from a database, any relevant disclosure data, texts, and/or documents from that are semantically related to the calculated embedding of the user query. Action generation system 100 may rank and curate the retrieved disclosure data (e.g., can be of any modalities), and orchestrate an LLM prompt that may steer the LLM to generate a response desired by the user device. After receiving response from the LLM, action generation system 100 may then determine whether the action generated (e.g., at least as part of the LLM response) applies to the user device and/or the merchant system. In addition, action generate system 100 may resolve the transaction claim based on determining whether the action applies to the user device and/or the merchant system. The action list associated with the transaction claim in the database may be updated accordingly after executing the action.

In 214, the embedding may be calculated for user query 212. The embedding may be calculated to represent the semantics of user query 212 in a multi-dimensional vector space, allowing for semantic and/or similarity search to be performed. In some aspects, the embedding approaches applied in 214 may be substantially similar to the embedding approaches at 206, but the embedding approaches applied in 214 can differ from the embedding approaches at 206.

In some aspects, user query 212 (with multiple modalities) may be converted into vectors using a feature extraction and/or embedding technique. For example, text documents can be represented as vectors using word embedding and/or sentence embedding including but not limited to BoW model, word embedding (e.g., Word2Vec, GloVe), and/or pre-trained language models (e.g., BERT, GPT). Images can be represented as vectors using convolutional neural networks, including but not limited to pre-trained models such as VGG, ResNet, Inception, and MobileNet—the models can be used as feature extractors to create image embedding, that is, the output of a specific layer or a combination of layer outputs can be used as the embedding. The unsupervised models, including but not limited to autoencoders may be used for embedding image data—by learning a representation (e.g., in a latent space) as the embedding. In some aspects, multi-modal embedding may be applied for user query 212 that may come from any modalities, including but not limited to texts, images, audios, and/or videos.

In 216, a search may be performed to retrieve the relevant texts and documents, and/or any data with multiple modalities within vector database 210 that are semantically related to the calculated embedding of user query from 214. In some aspects, the search process may index texts, fragments chunks of texts, and/or non-text data chunks of other modalities within vector database 210 based on their semantic representation from the vector embedding. Similarity between vectors may then be measured using a distance metric, such as cosine similarity, Euclidean distance, dot product, and/or any other distance metrics. In addition, a subset of the data chunks storied in vector database 210 may be identified based on determining the distance metrics within a threshold. A vector search database may be used to find the most similar vectors to a given query vector.

In some aspects, action generation system 100 may apply vector search to find similar data using artificial neural network (ANN) algorithms. When a query point is provided, the ANN algorithm may use an index to identify a set of candidate points that are likely to be close to the query point. This way, when querying vector database 210 to find the nearest neighbors of a query vector, instead of computing distances between the query vector and all vectors in vector database 210, action generation system 100 may adaptively compute distances between the query vector and a small number of candidate vectors that are embedded around the query vector.

In some aspects, action generation system 100 may also use a key word search to retrieve the relevant data chunks under instances where matching specific strings of the data chunks may be useful. For example, when searching for a proper name or a specific phrase, a keyword search might be more appropriate than a similarity search between different embedding vectors. This approach may allow action generation system 100 to find any information or data that may contain the exact name or phrase that are relevant to user query 212.

In 218, after querying a set of candidate vectors that are likely to be close or related to the query vector, the set of data chunks corresponding to the set of candidate vectors may be retrieved from vector database 210. Action generation system 100 may then rank the set of data chunks to obtain a subset of ranked matched data chunks.

In some aspects, action generation system 100 may rank the retrieved data chunks by their relevance, similarity, and/or other scores to the query and then fill the context window of LLM depending on the LLM capability. In some aspects, this may result in too much or not enough information being included in the context window of LLM. Techniques, including but not limited to creating summaries or combining different texts and/or data chunks semantically can help build a well-suited set for the subset of matched data chunks—that is, by shortening a paragraph-length data chunk to one or more sentences, the retrieved information may become simple, and more summaries can be included in subsequent analysis.

In some aspects, action generation system 100 may also curate (e.g., refine and/or filter) the set of data chunks obtained retrieved from vector database 210. In some aspects, action generation system 100 may use metadata associated with the retrieved data chunks to refine the search results. For example, action generation system 100 may use date to prioritize newer data chunks or focus on data chunks from a specific time period. Action generation system 100 may also use specific tags and/or categories to limit or prioritize search results based on relevant tags or categories, as they may have already been identified and classified. In addition, action generation system 100 may focus on particular sources or authors to ensure relevance of the search results.

In 220, action generation system 100 may orchestrate an LLM prompt based on the ranked and curated data chunks obtained from 218. The LLM prompt may include, but is not limited to, a query context 220*a*, an LLM instruction 220*b*, and/or retrieved information 220*c*.

In 222, action generation system 100 may query an LLM using the LLM prompt orchestrated in 220. In some aspects, action generation system 100 uses LLM orchestration to at least prompt, chain, manage, and/or LLMs. This may make one or more LLM calls (using the one or different LLMs) to address a certain tasks depending on the task difficulty and the LLM capability.

In 224, action generation system 100 may generate an action based on the LLM response from querying the LLM in 222. Action generation system 100 may determine whether the generated action from 224 can apply to the user device.

If the generated action may not apply to the user device, action generation system 100 may return back to 224 to re-generate a new action. In some aspects, in 224, action generation system 100 may submit a modified version of the LLM prompt to query to the LLM—typically asking the LLM to rephrase or refine its response based on a better understanding of the intent. In some aspects, this can also be done by providing additional context, clarifying ambiguities, or simply asking the LLM to re-interpret the original query in a different way to get a more precise answer.

If the generated action can apply to the user device, action generation system 100 may then determine whether the generated action from 224 can apply to the merchant system. In some aspects, in 232, if the generated action can also to the merchant system, action generation system 100 may execute the action to address the transaction claim. Otherwise, in 228, if the generated action may not apply to the merchant system, action generation system 100 may generate a dispute associated with the transaction claim. In addition, after resolving the transaction claim, action generation system 100 may update an action list associated with the transaction claim in vector database 210.

Figure 3:
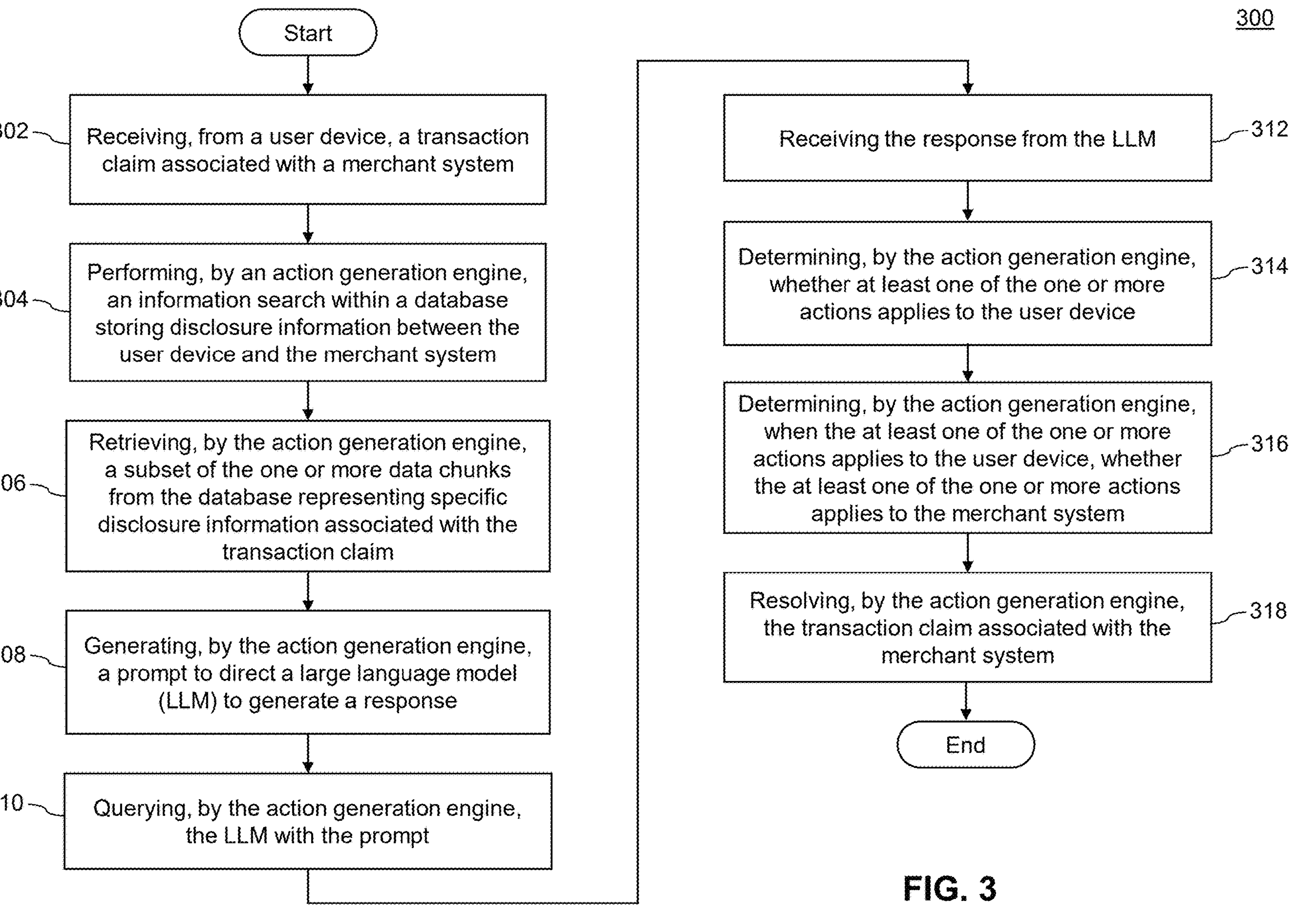
FIG. 3 is a flowchart illustrating a method for resolving a transaction claim associated with a merchant system, according to aspects of the present disclosure.

FIG. 3 is a flowchart illustrating a method 300 for resolving a transaction claim associated with a merchant system, according to aspects of the present disclosure. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art. Method 300 shall be described with reference to FIG. 1, FIG. 2A, and/or FIG. 2B. However, method 300 is not limited to those example aspects.

In 302, a transaction claim associated with a merchant system may be received from a user device. When a user device has initiated a transaction claim on their transaction at a specific merchant system location, the merchant system may be notified about this transaction claim, requiring them to investigate and provide evidence to support the transaction if necessary.

In 304, an information search may be performed within a database storing disclosure information between the user device and the merchant system, in which the disclosure information may be stored as one or more data chunks.

In some aspects, the disclosure information may include, but is not limited to, a transaction record of the user device associated with the merchant system, an agreement between the user device and the merchant system, a merchant policy associated with the transaction claim, a historical transaction claim, and/or an action associated with the historical transaction claim.

In some aspects, the database may be generated in which the generation may include, but is not limited to, tokenizing the disclosure information to obtain the one or more data chunks, generating a set of data embedding associated with the one or more data chunks in which each data embedding may be associated with a data chunk, generating one or more vector indexes to store the set of data embedding, and/or storing the one or more vector indexes into the database.

In some aspects, the disclosure information between the user device and the merchant system may be obtained over a period of time to extract a change of the disclosure information. For example, the disclosure information may be obtained by scrapping from a database storing this disclosure information. The scrapping may be performed by at least obtaining appropriate credentials to connect to the database and/or retrieving specific data points from a structured data source using a program or script, such as a specific query language (SQL) for specifying which data to extract in the database based on certain conditions. Once retrieved, the scraped data might need further cleaning, formatting, and/or transformation before being used in another application.

In particular, the current version of the obtained disclosure document may be compared with a previous version by at least looking for any differences in wording, details, or key facts, particularly focusing on areas, including but not limited to, material changes, risks, or financial information. Within those areas, the change may be identified from at least an agreement between the user device and the merchant system or a merchant policy associated with the transaction claim.

In some aspects, the disclosure information may then be updated in the database over a period of time to incorporate the change of the disclosure information. As part of the change, expired disclosure information between the user device and the merchant system may be deleted from the database and new disclosure information between the user device and the merchant system may be added to the database.

In 306, a subset of the one or more data chunks may be retrieved from the database representing specific disclosure information associated with the transaction claim in which the specific disclosure information may contain at least part of the disclosure information.

In some aspects, retrieving the subset of the one or more data chunk may include, but is not limited to, generating second data embedding associated with the transaction claim, calculating a set of distance metrics between the second data embedding and a set of data embedding associated with the one or more data chunks, and/or identifying the subset of the one or more data chunks stored in the database based on determining the set of distance metrics within a threshold.

In 308, a prompt may be generated based on combining the transaction claim, the subset of the one or more data chunks representing the specific disclosure information, and one or more instructions directing LLM to generate a response.

In 310, the LLM may be queried by action generation component 150 via an LLM gateway 160 with the prompt. In some aspects, querying is a prompt call to an LLM in which the querying can be a question and get an answer, or a request for summarization, or a much more complex instruction. More complex querying could involve repeated, chained, or looped prompt with multiple LLM calls, for example, a series of prompts, with the output from one prompt serving as the input for the next prompt, essentially creating a sequence of prompts to guide the LLM through a complex task by breaking it down into smaller, more manageable steps.

In 312, the response from the LLM may be received by action generation component 150 via an LLM gateway 160 in which the response may include, but is not limited to one or more actions associated with the transaction claim. The one or more actions may refer to the final decision reached regarding the transaction claim, typically meaning either the transaction is approved as valid and stands as is, or the transaction claim is upheld in favor of one party. In some aspects, the one or more actions may include, but are not limited to, an issued chargeback or refund (or other corrective actions) to the user device if the transaction claim is deemed valid, a free return (and/or with a fee) of the purchase items to the merchant system, and/or a upheld transaction if the evidence supports the validity of the transaction.

In 314, whether at least one of the one or more actions can apply to the user device may be determined by an action processing component 170. In some aspects, this determination can be received from a user device 120 via a user interface (e.g., part of user device 120) in which the user device may provide, through interactive elements like buttons, text boxes, or dropdown menus within the user interface, an input indicating whether the user agrees or satisfied with the one or more actions. In some aspects, this determination can also be made automatically by action processing component 170 in which the one or more actions may be compared with the user device's historically approved or declined actions associated with similar or relevant transaction claims. By doing this, a set of rules and criteria may be relied by action processing component 170 that specify what constitutes an approved or declined action by considering factors, including but not limited to, user permissions, data constraints, system state, and/or any external factors.

In 316, when the at least one of the one or more actions can apply to the user device, whether the at least one of the one or more actions can apply to the merchant system may be determined by an action processing component 170. Similarly, a merchant interface (e.g., part of merchant system 110) may be used by a merchant system 110 to provide whether the one or more actions are approved or declined by the merchant system. The one or more actions may also be automatically approved or declined by at least comparing the actions with the merchant system's historically approved or declined actions associated with similar or relevant transaction claims—this determination can be done by at least using a machine learning-based system or a predefined rule based system associated with an action processing component 170.

In 318, the transaction claim associated with the merchant system may be resolved in which the resolution may include, but is not limited to, executing the at least one of the one or more actions to address the transaction claim based on the at least one of the one or more actions applying to the merchant system, and/or generating a dispute associated with the transaction claim based on the at least one of the one or more actions not applying to the merchant system.

In some aspects, once both the user device and the merchant system approval or agree with the one or more actions, the resolution may be generated by action processing component 170 that involves taking the necessary steps to put the agreed-upon resolution to the transaction claim into practice. If either of the user device or merchant system may not approve the one or more actions, a dispute associated with the transaction claim may be automatically generated and forwarded by action processing component 170 to the bank associated with the merchant system. The dispute statement may be generated by action processing component 170 that states the reason for dispute and attach any disclosure information between the user device and the merchant system, including but not limited to, the transaction details, an agreement made between the two parties, and/or any supporting evidence of both the user devices and merchant systems provided, such as receipts, emails, or screenshots.

In some aspects, within the database, one or more historical transaction claims and one or more actions associated with the one or more historical transaction claims, associated with the merchant system over a period of time, may be analyzed to generate a user behavior pattern associated with the user device and a merchant behavior pattern associated with the merchant system. In some aspects, a user score indicating a user trustworthiness level may be generated from the user behavior pattern, and a merchant score indicating a merchant trustability level may be generated from the merchant behavior pattern, in which the user score and the merchant score may be factored into at least resolving the transaction claim or receiving a new transaction claim associated with a merchant system.

Example Scenario: TV Purchase from Merchant X

This example illustrates a dispute, but this can also be abstracted to include, but is not limited to, marketing communication monitoring, data brokering, and/or common violations of customer agreements.

Day 1: When a user makes a purchase or signs an agreement with a merchant, a record of those terms and stipulations are registered into action generation system 100 by data processing component 130. That record can be text, or image and is stored in a centrally managed location with timestamps and proof. In this example, the customer purchases a TV on a Memorial Day sale from Merchant X. The sale terms on the website indicate a promotional price was set, but returns were still allowed as usual within 90 days of purchase if the device was deemed defective by day 90.

Day 80: the user notices the defective TV.

Day 81: the user emails the merchant to make a return claim in line with the terms but does not hear back. This email or similar communication could be processed by data processing component 130 and then sent through action generation system 100 for record keeping purposes.

Day 91: the user calls the merchant to inquiries about the claim status. The user is instructed by the representative that there is no record of the email, and since it is 91 Days from purchase, there is nothing the user can do (e.g., unable to refund or return).

In this way, this user can use disclosure retrieval component 140 of action generation system 100 to review the terms to reference what was agreed to and the action generation system can enforce a policy on that merchant, and take a corrective action. By taking any corrective actions, as the user raised the claim through action generation system 100 on Day 81, there is a record of what the appropriate action should be, and viable enforcement could be taken by action generation component 150 using at least a decision model queried by the action generation component via an LLM gateway 160, in which the decision model evaluates the specific terms and claims from both the user and the customer.

At scale, action processing component 170 of action generation system 100 also creates merchant trustability and customer trustworthiness scores which will be factored into the decisions for future inquires. In addition, action processing component 170 of action generation system 100 could scrape merchant polices on a regular basis to see how policies change over time to anticipate and prepare for updates or inputs since users may typically not read them regularly.

Figure 4:
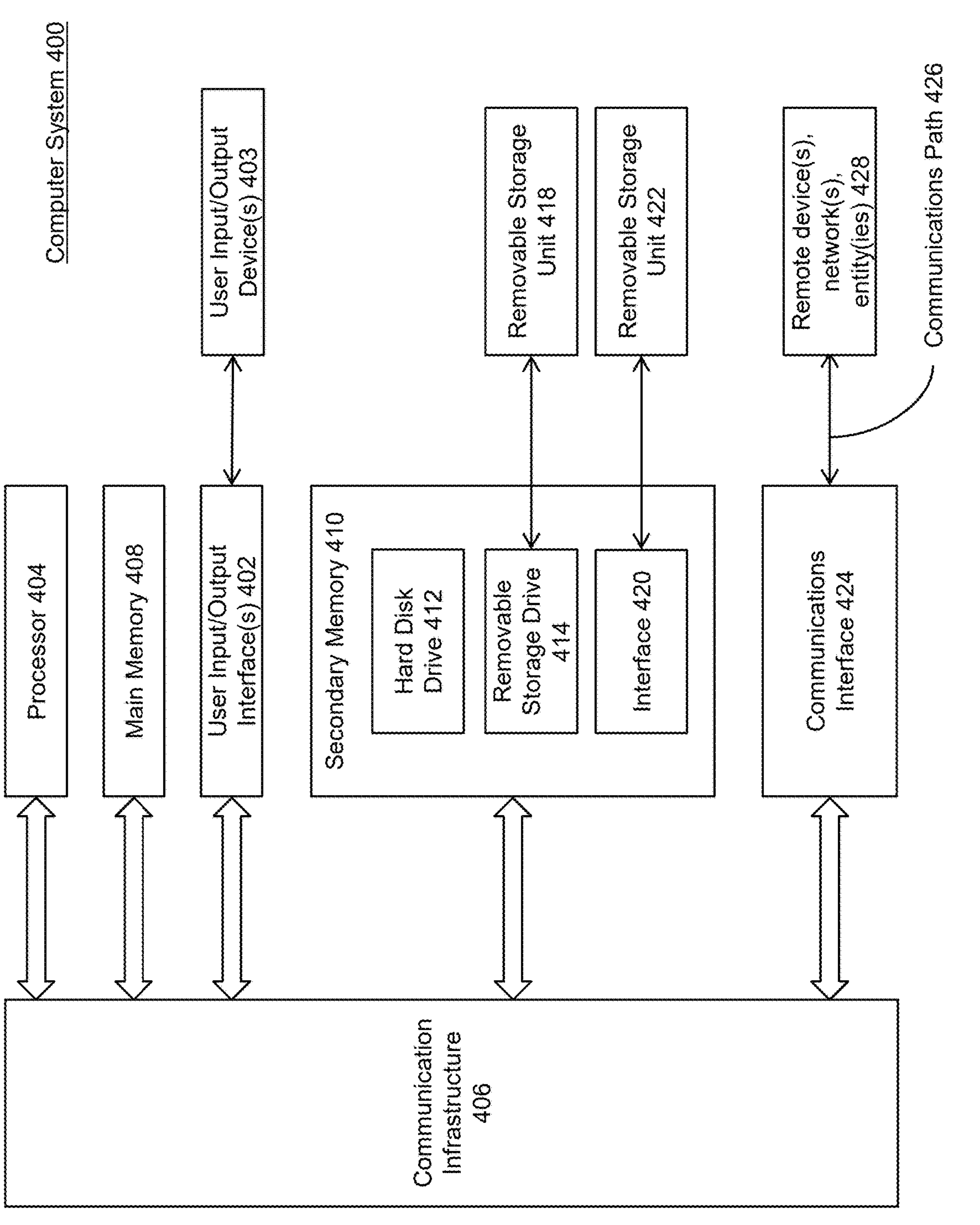
FIG. 4 illustrates an example computer system useful for implementing various aspects of the present disclosure.

Various aspects may be implemented, for example, using one or more well-known computer systems, such as computer system 400 shown in FIG. 4. For example, aspects herein using the text summarization system may be implemented using combinations or sub-combinations of computer system 400. Also or alternatively, one or more computer systems 400 may be used, for example, to implement any of the aspects discussed herein, as well as combinations and sub-combinations thereof. A "module," as the term is used herein, is a computational element that performs one or more functions according to computer readable instructions stored on one or more memories or other non-transitory computer-readable media.

Computer system 400 may include one or more processors (also called central processing units, or CPUs), such as a processor 404. Processor 404 may be connected to a communication infrastructure or bus 406.

Computer system 400 may also include user input/output device(s) 403, such as monitors, keyboards, pointing devices, etc., which may communicate with communication infrastructure 406 through user input/output interface(s) 402.

One or more of processors 404 may be a graphics processing unit (GPU). In an aspect, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 may also include a main or primary memory 408, such as random access memory (RAM). Main memory 408 may include one or more levels of cache. Main memory 408 may have stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 may include a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 may read from and/or write to removable storage unit 418.

Secondary memory 410 may include other means, devices, components, instrumentalities or other approaches for allowing computer programs and/or other instructions and/or data to be accessed by computer system 400. Such means, devices, components, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 400 may further include a communication or network interface 424. Communication interface 424 may enable computer system 400 to communicate and interact with any combination of external devices, external networks, external entities, etc. (individually and collectively referenced by reference number 428). For example, communication interface 424 may allow computer system 400 to communicate with external or remote devices 428 over communications path 426, which may be wired and/or wireless (or a combination thereof), and which may include any combination of LAN, WANs, the Internet, etc. Control logic and/or data may be transmitted to and from computer system 400 via communication path 426.

Computer system 400 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 400 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some aspects, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400 or processor(s) 404), may cause such data processing devices to operate as described herein.

Based on the teachings contained in this disclosure, it will be apparent to persons skilled in the relevant art(s) how to make and use aspects of this disclosure using data processing devices, computer systems and/or computer architectures other than that shown in FIG. 4. In particular, aspects can operate with software, hardware, and/or operating system implementations other than those described herein.

It is to be appreciated that the Detailed Description section, and not any other section, is intended to be used to interpret the claims. Other sections can set forth one or more but not all exemplary aspects as contemplated by the inventor(s), and thus, are not intended to limit this disclosure or the appended claims in any way.

While this disclosure describes exemplary aspects for exemplary fields and applications, it should be understood that the disclosure is not limited thereto. Other aspects and modifications thereto are possible, and are within the scope and spirit of this disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative aspects can perform functional blocks, steps, operations, methods, etc. using orderings different than those described herein.

References herein to "one aspect," "an aspect," "an example aspect," or similar phrases, indicate that the aspect described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it would be within the knowledge of persons skilled in the relevant art(s) to incorporate such feature, structure, or characteristic into other aspects whether or not explicitly mentioned or described herein. Additionally, some aspects can be described using the expression "coupled" and "connected" along with their derivatives. These terms are not necessarily intended as synonyms for each other. For example, some aspects can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary aspects, but should be defined only in accordance with the following claims and their equivalents.

What is claimed is:

1. A method, comprising:

performing, by an action generation engine using one or more processors, an information search within a database storing disclosure information between a user device and a merchant system, wherein the disclosure information is stored as one or more data chunks, and wherein the merchant system does not share the disclosure information with the user device without the action generation engine;

retrieving, by the action generation engine, a subset of the one or more data chunks from the database representing specific disclosure information associated with a transaction claim received from the user device and associated with the merchant system, wherein the specific disclosure information comprises at least part of the disclosure information;

generating, by the action generation engine, a prompt based on combining the transaction claim, the subset of the one or more data chunks, and one or more instructions for querying a large language model (LLM);

generating, by the action generation engine using the LLM and the prompt, one or more actions to resolve the transaction claim from the user device; and in response to the one or more actions being generated, resolving, by the action generation engine, the transaction claim associated with the merchant system, comprising:

transmitting, to the merchant system by the action generation engine based on the one or more actions applying to the merchant system, the one or more actions to cause the merchant system to execute the one or more actions to address the transaction claim; or generating, by the action generation engine, a dispute associated with the transaction claim based on the one or more actions not applying to the merchant system.

2. The method according to claim 1, wherein the disclosure information comprises a transaction record of the user device associated with the merchant system, an agreement between the user device and the merchant system, a merchant policy associated with the transaction claim, a historical transaction claim, and an action associated with the historical transaction claim.

3. The method according to claim 1, further comprising:

obtaining the disclosure information between the user device and the merchant system over a period of time to extract a change of the disclosure information, wherein the change is identified from at least an agreement between the user device and the merchant system or a merchant policy associated with the transaction claim; and updating the disclosure information in the database to incorporate the change of the disclosure information.

4. The method according to claim 1, further comprising:

analyzing, within the database, one or more historical transaction claims and one or more actions associated with the one or more historical transaction claims to generate a user behavior pattern associated with the user device and a merchant behavior pattern associated with the merchant system;

generating a user score indicating a user trustworthiness level from the user behavior pattern; and generating a merchant score indicating a merchant trustability level from the merchant behavior pattern, wherein the user score and the merchant score are factored into at least resolving the transaction claim or receiving a new transaction claim associated with the merchant system.

5. The method according to claim 1, wherein the database is generated by the action generation engine and updated over a period of time to incorporate new disclosure information between the user device and the merchant system, comprising:

tokenizing the disclosure information and the new disclosure information to obtain the one or more data chunks;

generating a set of data embedding associated with the one or more data chunks, wherein each data embedding is associated with a data chunk;

generating one or more vector indexes to store the set of data embedding; and storing the one or more vector indexes into the database.

6. The method according to claim 1, wherein retrieving the subset of the one or more data chunks comprises:

generating a second data embedding associated with the transaction claim;

calculating a set of distance metrics between the second data embedding and a set of data embedding associated with the one or more data chunks; and identifying the subset of the one or more data chunks stored in the database based on determining the set of distance metrics within a threshold.

7. A system, comprising:

an action generation engine configured to generate an action to resolve a transaction claim, wherein the transaction claim is received from a user device and is associated with a merchant system;

a memory configured to store operations; and one or more processors configured to perform the operations, the operations comprising:

performing, by the action generation engine, an information search within a database storing disclosure information between the user device and the merchant system, wherein the disclosure information is stored as one or more data chunks, and wherein the merchant system does not share the disclosure information with the user device without the action generation engine;

retrieving, by the action generation engine, a subset of the one or more data chunks from the database representing specific disclosure information associated with the transaction claim, wherein the specific disclosure information comprises at least part of the disclosure information;

generating, by the action generation engine, a prompt based on combining the transaction claim, the subset of the one or more data chunks, and one or more instructions querying a large language model (LLM);

generating, by the action generation engine using the LLM and the prompt, one or more actions to resolve the transaction claim from the user device; and in response to the one or more actions being generated, resolving, by the action generation engine, the transaction claim associated with the merchant system, comprising:

transmitting, to the merchant system by the action generation engine based on the one or more actions applying to the merchant system, the one or more actions to cause the merchant system to execute the one or more actions to address the transaction claim; or generating, by the action generation engine, a dispute associated with the transaction claim based on the one or more actions not applying to the merchant system.

8. The system according to claim 7, wherein the disclosure information comprises a transaction record of the user device associated with the merchant system, an agreement between the user device and the merchant system, a merchant policy associated with the transaction claim, a historical transaction claim, and an action associated with the historical transaction claim.

9. The system according to claim 7, wherein the one or more processors are further configured to perform the operations comprising:

obtaining the disclosure information between the user device and the merchant system over a period of time to extract a change of the disclosure information, wherein the change is identified from at least an agreement between the user device and the merchant system or a merchant policy associated with the transaction claim; and updating the disclosure information in the database to incorporate the change of the disclosure information.

10. The system according to claim 7, wherein the one or more processors are further configured to perform the operations comprising:

analyzing, within the database, one or more historical transaction claims and one or more actions associated with the one or more historical transaction claims to generate a user behavior pattern associated with the user device and a merchant behavior pattern associated with the merchant system;

generating a user score indicating a user trustworthiness level from the user behavior pattern; and generating a merchant score indicating a merchant trustability level from the merchant behavior pattern, wherein the user score and the merchant score are factored into at least resolving the transaction claim or receiving a new transaction claim associated with the merchant system.

11. The system according to claim 7, wherein the database is generated by the action generation engine and updated over a period of time to incorporate new disclosure information between the user device and the merchant system, comprising:

tokenizing the disclosure information and the new disclosure information to obtain the one or more data chunks;

generating a set of data embedding associated with the one or more data chunks, wherein each data embedding is associated with a data chunk;

generating one or more vector indexes to store the set of data embedding; and storing the one or more vector indexes into the database.

12. The system according to claim 7, wherein retrieving the subset of the one or more data chunks comprises:

generating a second data embedding associated with the transaction claim;

calculating a set of distance metrics between the second data embedding and a set of data embedding associated with the one or more data chunks; and identifying the subset of the one or more data chunks stored in the database based on determining the set of distance metrics within a threshold.

13. A non-transitory computer-readable storage device having instructions stored thereon, execution of which, by one or more processing devices of an action generation engine, causes one or more processors to perform operations comprising:

performing, by the action generation engine, an information search within a database storing disclosure information between a user device and a merchant system, wherein the disclosure information is stored as one or more data chunks, and wherein the merchant system does not share the disclosure information with the user device without the action generation engine;

retrieving, by the action generation engine, a subset of the one or more data chunks from the database representing specific disclosure information associated with a transaction claim received from the user device and associated with the merchant system, wherein the specific disclosure information comprises at least part of the disclosure information;

generating, by the action generation engine, a prompt based on combining the transaction claim, the subset of the one or more data chunks, and one or more instructions querying a large language model (LLM);

generating, by the action generation engine using the LLM and the prompt, one or more actions to resolve the transaction claim from the user device; and in response to the one or more actions being generated, resolving, by the action generation engine, the transaction claim associated with the merchant system, comprising:

transmitting, to the merchant system by the action generation engine based on the one or more actions applying to the merchant system, the one or more actions to cause the merchant system to execute the one or more actions to address the transaction claim; or generating, by the action generation engine, a dispute associated with the transaction claim based on the one or more actions not applying to the merchant system.

14. The non-transitory computer-readable storage device according to claim 13, wherein the operations further comprise:

obtaining the disclosure information between the user device and the merchant system over a period of time to extract a change of the disclosure information, wherein the change is identified from at least an agreement between the user device and the merchant system or a merchant policy associated with the transaction claim; and updating the disclosure information in the database to incorporate the change of the disclosure information.

15. The non-transitory computer-readable storage device according to claim 13, wherein the operations further comprise:

analyzing, within the database, one or more historical transaction claims and one or more actions associated with the one or more historical transaction claims to generate a user behavior pattern associated with the user device and a merchant behavior pattern associated with the merchant system;

generating a user score indicating a user trustworthiness level from the user behavior pattern; and generating a merchant score indicating a merchant trustability level from the merchant behavior pattern, wherein the user score and the merchant score are factored into at least resolving the transaction claim or receiving a new transaction claim associated with the merchant system.

16. The non-transitory computer-readable storage device according to claim 13, wherein the database is generated by the action generation engine and updated over a period of time to incorporate new disclosure information between the user device and the merchant system, the operations further comprising:

tokenizing the disclosure information and the new disclosure information to obtain the one or more data chunks;

generating a set of data embedding associated with the one or more data chunks, wherein each data embedding is associated with a data chunk;

generating one or more vector indexes to store the set of data embedding; and storing the one or more vector indexes into the database.

17. The non-transitory computer-readable storage device according to claim 13, wherein retrieving the subset of the one or more data chunks comprises:

generating a second data embedding associated with the transaction claim;

calculating a set of distance metrics between the second data embedding and a set of data embedding associated with the one or more data chunks; and identifying the subset of the one or more data chunks stored in the database based on determining the set of distance metrics within a threshold.

18. The method according to claim 1, wherein the one or more actions are generated by the action generation engine using the LLM and a chaining of the prompt and a response of the LLM being generated based on the prompt, wherein the LLM is first queried by the prompt to generate the response, and wherein in response to receiving the generated response from the LLM, the LLM is second queried by the response to generate the one or more actions.

19. The system according to claim 7, wherein the one or more actions are generated by the action generation engine using the LLM and a chaining of the prompt and a response of the LLM being generated based on the prompt, wherein the LLM is first queried by the prompt to generate the response, and wherein in response to receiving the generated response from the LLM, the LLM is second queried by the response to generate the one or more actions.

20. The non-transitory computer-readable storage device according to claim 13, wherein the one or more actions are generated by the action generation engine using the LLM and a chaining of the prompt and a response of the LLM being generated based on the prompt, wherein the LLM is first queried by the prompt to generate the response, and wherein in response to receiving the generated response from the LLM, the LLM is second queried by the response to generate the one or more actions.

* * * * *